United States Patent [19]
Jordberg et al.

[11] Patent Number: 5,938,377
[45] Date of Patent: Aug. 17, 1999

[54] CUTTING TOOL FOR CHIP REMOVAL AND A LOCKING PIN

[75] Inventors: Jonas Jordberg, Norberg; Mikael Jansson, Avesta, both of Sweden

[73] Assignee: Seco Tools AB, Fagersta, Sweden

[21] Appl. No.: 08/837,415

[22] Filed: Apr. 18, 1997

[30] Foreign Application Priority Data

Apr. 19, 1996 [SE] Sweden ................................. 9601489

[51] Int. Cl.$^6$ ................................................. B23B 29/04
[52] U.S. Cl. ........................ 407/104; 407/105; 407/103
[58] Field of Search ............................. 407/48, 103, 104, 407/105, 106

[56] References Cited

U.S. PATENT DOCUMENTS

| | | |
|---|---|---|
| 3,341,920 | 9/1967 | Kelm . |
| 3,341,921 | 9/1967 | Welller et al. ........................... 407/104 |
| 3,341,923 | 9/1967 | Kelm . |
| 3,533,150 | 10/1970 | Welch ..................................... 407/104 |
| 3,740,807 | 6/1973 | Getts ....................................... 407/104 |
| 4,283,163 | 8/1981 | Grafe et al. ............................. 407/104 |
| 4,397,592 | 8/1983 | Erickson ................................. 407/104 |

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

The present invention relates to a tool for chip removal including a holder and a cutting insert provided with a through-hole to abut against a base surface and support surfaces in a cutting insert pocket in the holder. A locking pin threaded into a boring in the holder is received by the insert hole. The pin includes a head, a waist, a conical portion, and a threaded portion, which pin portions have a common center axis in an unloaded condition. The locking pin is of a quick action type. The boring includes an eccentric conical recess provided to displace the cutting insert in a direction towards the support surfaces in cooperation with the pin during tightening of the pin in the threaded part of the boring. The pin is provided to be able to secure both negative and positive cutting inserts in the insert pocket, by the head and the waist at a final phase of the pin tightening provided to elastically bend in a direction from the support surfaces. A transition between the head and waist cooperates with a profiled hole in a first type of cutting insert while the head cooperates with a cylindrical insert hole in another type of cutting insert.

14 Claims, 6 Drawing Sheets

CUTTING TOOL FOR CHIP REMOVAL AND A LOCKING PIN

TECHNICAL BACKGROUND

The present invention relates to a tool for chip removal comprising a holder and a cutting insert with a through-hole, provided to abut against a base surface and support surfaces in an insert pocket of the holder, said holder having a boring receiving a threaded locking pin projecting into the insert hole, said pin comprising a head, a waist, a conical portion and a threaded portion, said pin being of a quick action type, said pin portions having a common center axis in an unloaded condition, said boring comprising a conical recess provided to displace the cutting insert in direction towards the support surfaces by means of the pin, at tightening of the pin in the threaded part of the boring.

Through U.S. Pat. No. 3,341,920 is previously known a cutting tool of above-captioned type. The cutting tool comprises a negative cutting insert having a cylindrical insert hole. The locking pin is adapted to tilt at tightening, such that the cutting insert is pushed towards support surfaces in the holder. These support surfaces however, can at most be provided 90° relative to the base surface of the insert pocket in order to lock the cutting insert in correct position. In case so called positive cutting inserts shall be positioned, another type of locking pin is required. Such a pin is shown for example in U.S. Pat. No. 3,341,923, wherein the locking pin comprises a conical head, which forces the cutting insert downwardly against the base surface simultaneously as the cutting insert is forced against the support surfaces forming obtuse angles with the base surface.

OBJECTS OF THE INVENTION

One object of the present invention is to provide a cutting tool with a quick action locking pin wherein cutting inserts with straight cylindrical holes and cutting inserts with profiled holes can be positioned.

Another object of the present invention is to provide a cutting tool with a quick action locking pin wherein the cutting insert can be positioned in a quick and safe manner.

BRIEF DESCRIPTION OF THE DRAWINGS

These and other objects have been achieved by a cutting tool according to the present invention such as it is defined in the appended claims with reference to the drawings, wherein:

DETAILED DESCRIPTION OF THE INVENTION

Figure 1:
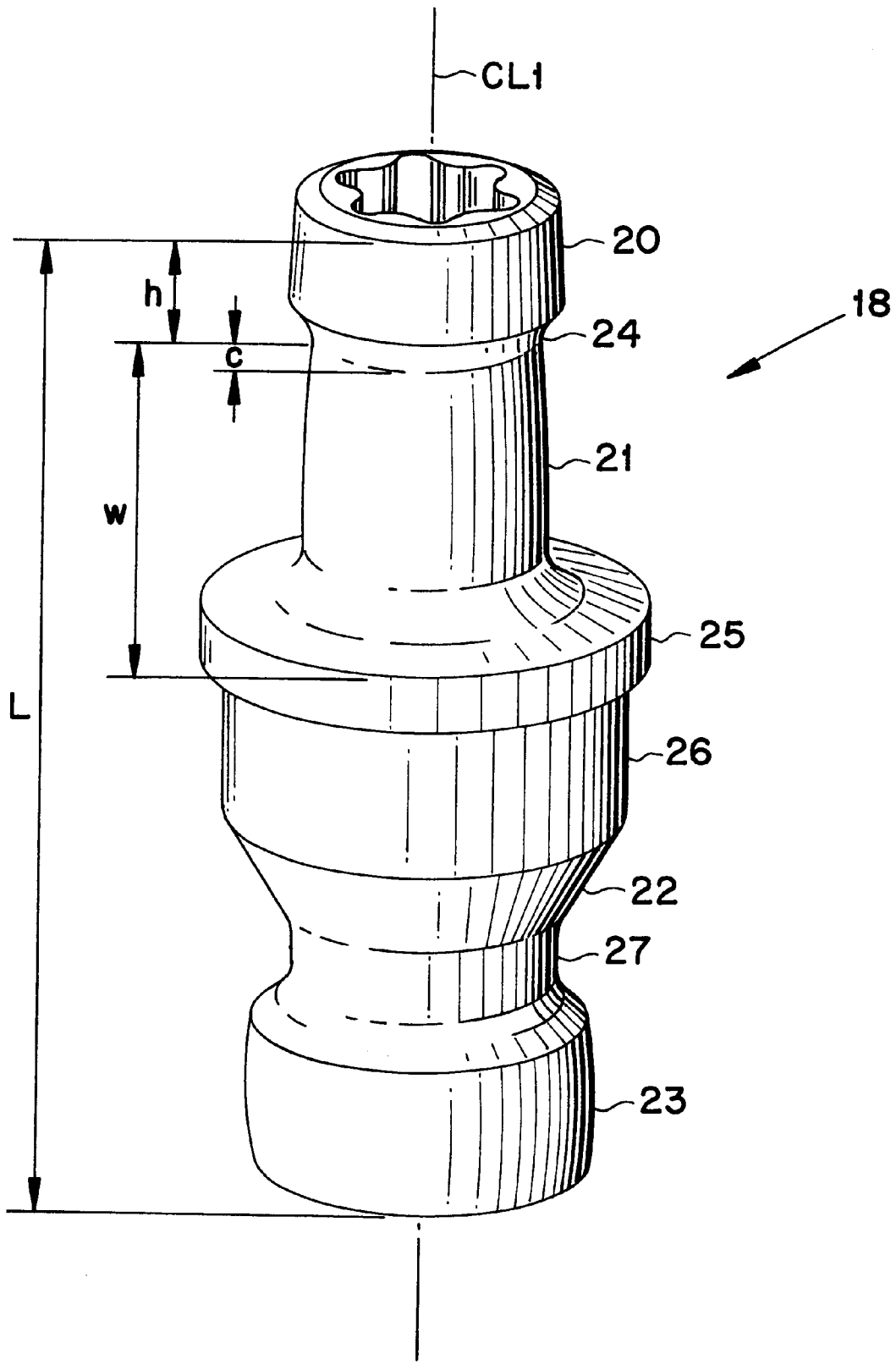
FIG. 1 shows a perspective view of a locking pin according to the present invention.
Figure 2A:
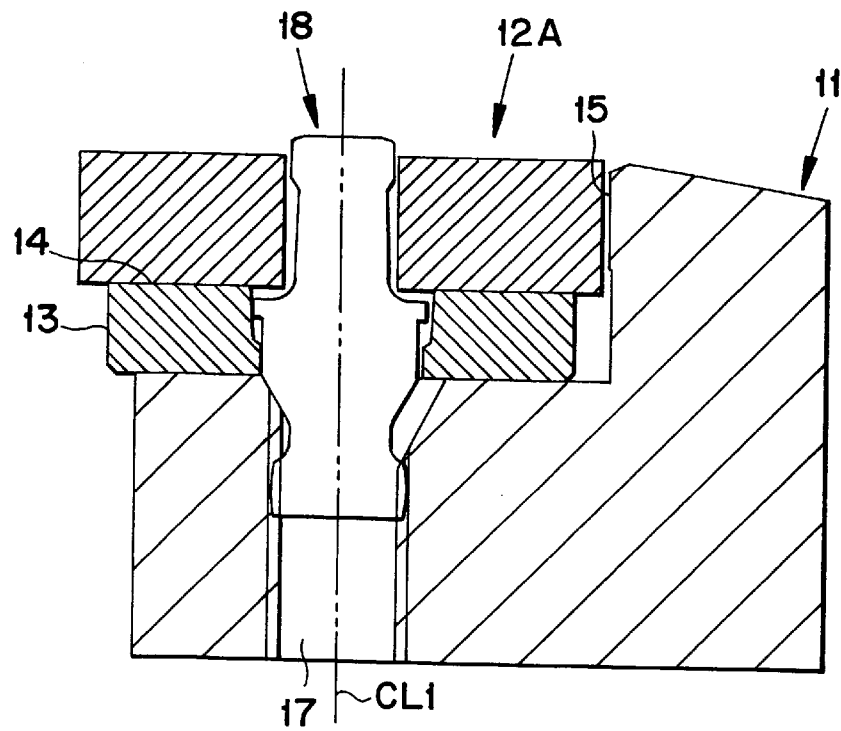
FIGS. 2A and 2B show a cutting tool according to the present invention in sectioned side views.
Figure 2B:
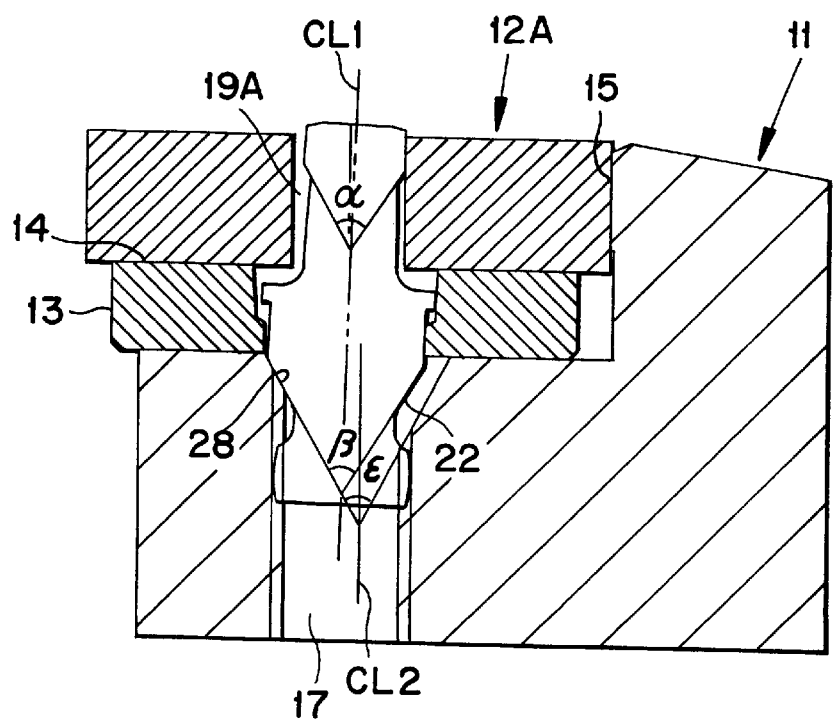
Figure 4:
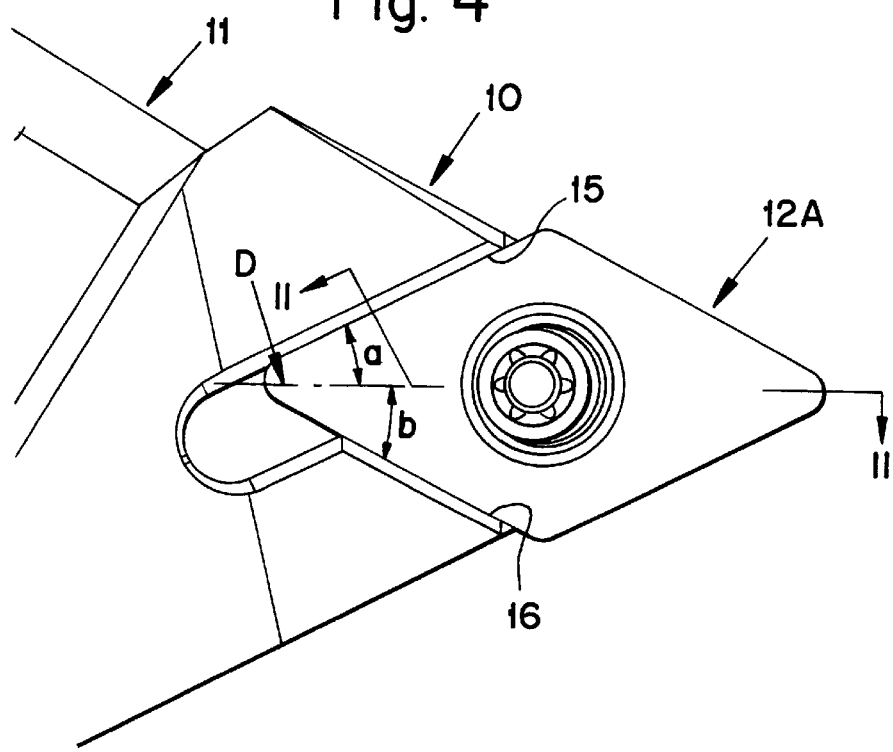
FIG. 4 shows a top view of the cutting tool.

The cutting tool according to the present invention is designated by 10 in FIG. 4. As shown in FIGS. 2A and 2B, the tool 10 comprises a holder 11 and a cutting insert 12A with a through-hole, provided to abut directly or preferably indirectly via a shim 13, against a base surface 14 and provided to abut against support surfaces 15, 16 in a cutting insert pocket in the holder 11. A locking pin 18 threaded into a boring 17 of the holder is received by the insert hole 19A. The pin 18 comprises a head 20, a waist 21, a first conical portion 22 and a threaded portion 23, which best appears from FIGS. 1 and 2A. These pin parts have a common center axis CL1 in an unloaded condition. The head 20 is substantially somewhat conical and connects to a second conical portion 24 by means of the radius R1. The second conical portion 24 is defined by an acute angle $\alpha$, which lies in the interval of 40–70°, and is preferably of the magnitude of 60°. The other conical portion 24 connects further to the waist 21 by means of the radius R2. The radius R2 is bigger than the radius R1 and is of the magnitude of 0.2 mm. The radius R2 is chosen bigger than R1 due to strength reasons while the radius R1 is chosen small for maximizing the envelope surface of the head. The waist 21 increases somewhat in cross sectional area in direction towards a radially projecting flange 25, provided to safeguard the shim 13 against involuntary unloading in a known manner. The flange 25 forms the biggest diameter of the pin. The transition between the waist and the flange is formed by a concave portion the radius R3 of which outreaches radius R2 with at least a factor 4, since relatively great strains come to influence this area of the pin during use. The flange further connects to a cylindrical portion 26, which connects to the first conical portion 22. The first conical portion 22 is defined by an acute angle $\beta$, which lies within the interval of 40–70°, and is preferably of the magnitude of 60°, in order to cause a quick tilting of the pin during insert mounting. The first conical portion connects to the threaded portion 23 via a second waist 27. The threaded portion 23 is part spherical for allowing tilting in spite of the engagement with a threaded boring 17. The upper and lower free end surfaces of the pin are preferably provided with key grips. The total length of pin is designated by L, whereof about 8–12%, preferably around 10% of a total length of the pin, consists of the height h of the head 20 and about 4% consists of the axial dimension c of the conical portion 24 while the length w of the waist 21 to the flange 25 constitutes 24–32%, preferably about 28% of the length L. Said measures L, h, c and w are measured parallel with the center axis CL1.

In the holder 11, the boring 17 comprises a conical recess 28 provided to displace, by means of the pin, the cutting insert in direction towards the support surfaces at tightening of the pin in the threaded part 17 of the boring. The boring 17 extends substantially perpendicularly to the base surface 14. The recess 28 has a central line CL2 displaced in a known manner in order to form a defined, one-sided abutment surface 28 for the conical surface 22 of the pin. The abutment surface 28 is facing the support surfaces 15 and 16. The recess 28 is defined by an acute angle $\epsilon$, which lies in the interval of 40–70°, and is preferably in the magnitude of 54°, in order to attain contact as close to the base surface 14 as possible. The angle $\epsilon$ shall consequently be bigger than the angle $\beta$.

The shim 13 is polygonal and has the same basic shape as the associated cutting insert and has a central hole for receiving the pin 18. The hole comprises a shoulder provided to cooperate with the flange 25 on the pin. The smallest diameter of shoulder is smaller than the biggest diameter of flange 25, such that the shim can not get loose from the holder during insert change for example. The cutting insert 12A has a negative basic shape in the embodiment according to FIGS. 2A and 2B. This means that the major surfaces of the cutting insert are perpendicular to its side surfaces. The cutting insert has a substantially cylindrical hole 19A.

Figure 3:
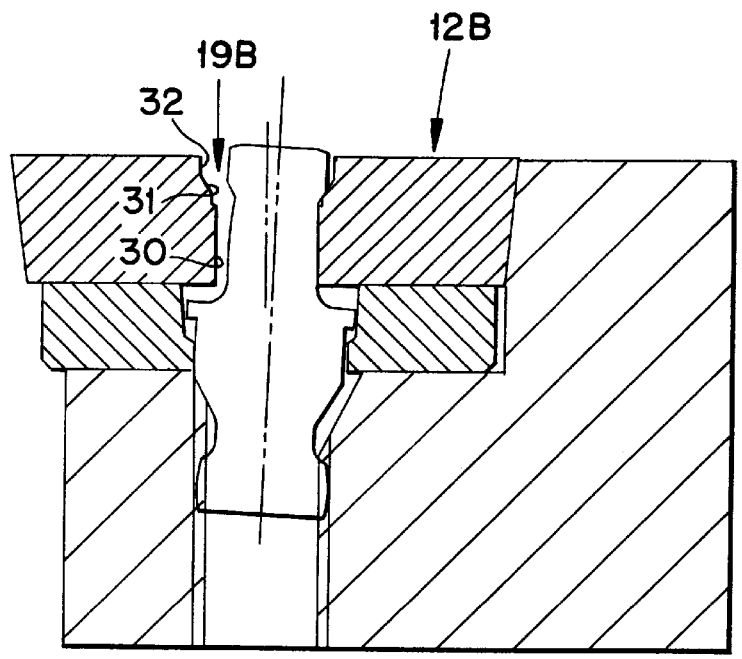
FIG. 3 shows an alternative embodiment of a cutting tool according to the present invention in a sectioned side view.
Figure 8:
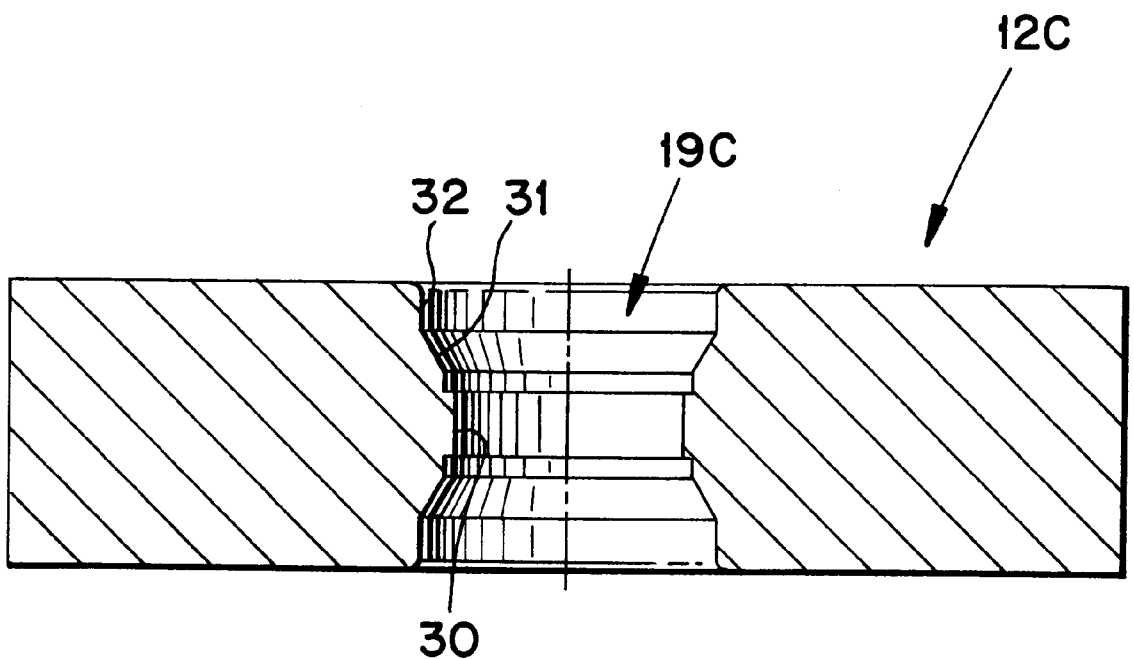
FIG. 8 shows a cutting insert in a cross section, with a double profiled hole.

In FIG. 3 a cutting insert with positive basic shape is shown, wherein the upper major surface of the cutting insert form an acute angle with its side surfaces. The hole 19B of the cutting insert is profiled and comprises a cylindrical lower part 30, a conical part 31 and a radially bigger cylindrical part 32. The conical part 31 is defined by an acute angle, which lies within the interval of 40–70°, and is preferably in the magnitude of 60°, i.e. most preferably just as great as the angles $\alpha$ and $\beta$ indicated above. This type of profiled hole can be used also at negative insert shapes and the hole 19C of the cutting insert 12C may be double profiled such as shown FIG. 8. A purely cylindrical hole cannot be used at positive insert shapes in combination with the present type of locking pin, since the cutting insert then would climb on the support surfaces 15, 16 at clamping.

Figure 5A:
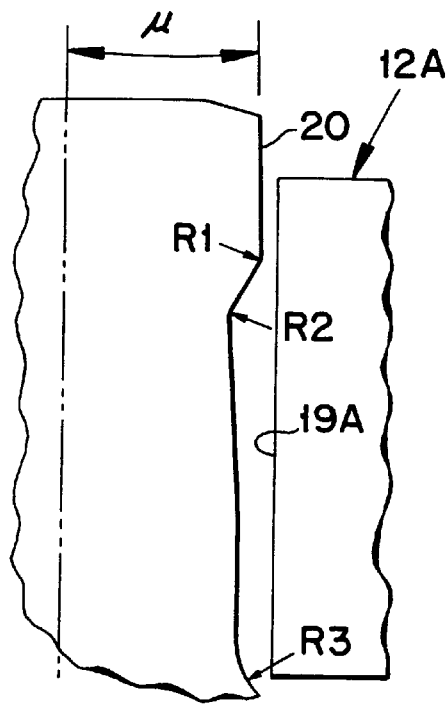
FIGS. 5A, 5B and 5C show sectioned side views during mounting of a cutting tool according to FIGS. 2A and 2B.
Figure 5B:
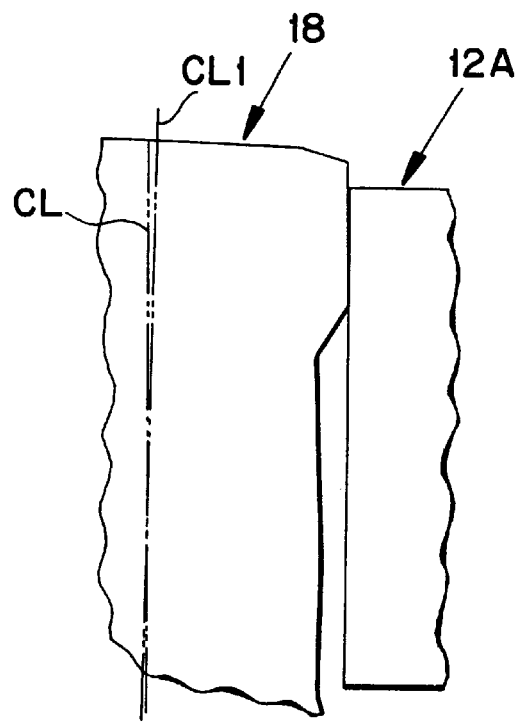
Figure 5C:
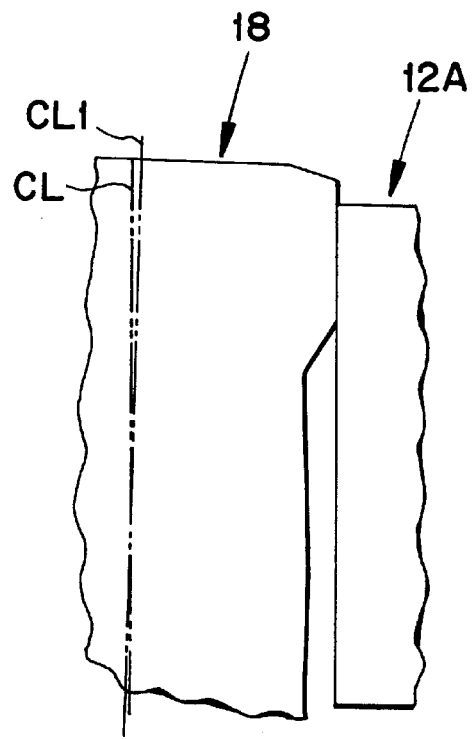

When mounting a negative cutting insert in holder according to FIGS. 2A, 2B and 5A–5C, the cutting insert 12A is brought over the pin such that the hole 19A will occupy the major part of the head 20 and of the waist 21 of the pin. It is understood that the shim 13 in this situation already has been mounted in a known manner and that cooperating threads engage each other fully and that the center axis CL1 of the pin substantially coincides with the center axis CL of the boring 17. Subsequently the pin is rotated via the key grip with some appropriate tool such that the conical surfaces 22 and 28 abut against each other. The pin is tilted in a direction D forming acute angles a and b with respective ones of the support surfaces 15 and 16 during further screwing such that the cylindrical envelope surface of the head 20 abuts against the cylindrical bore wall of the cutting insert, according to FIG. 5B. Thereby the cutting insert is displaced until its side surfaces engage with the support surfaces 15 and 16, respectively. In order to compensate for the angle change of maximum 1° which the pin is tilting, as well as the elastic deformation which the support surfaces are submitted to and the plastic deformation that the pin is submitted to, the head is made conical, an angle $\mu$ of about 1–2° relative to the center axis CL1, with the apex facing away from the base surface 14, to avoid lifting of a forward edge of the cutting insert. Thereby a line or area of contact is obtained between the head and the hole instead of only a point of contact at radius R1, such as is shown the intermediate position in FIG. 5B. The positions according to FIG. 5A and 5C are separate about ¾ revolution in rotation of the pin, whereof the last eighth of the revolution form said line or area of contact, according to FIG. 5C.

Figure 6A:
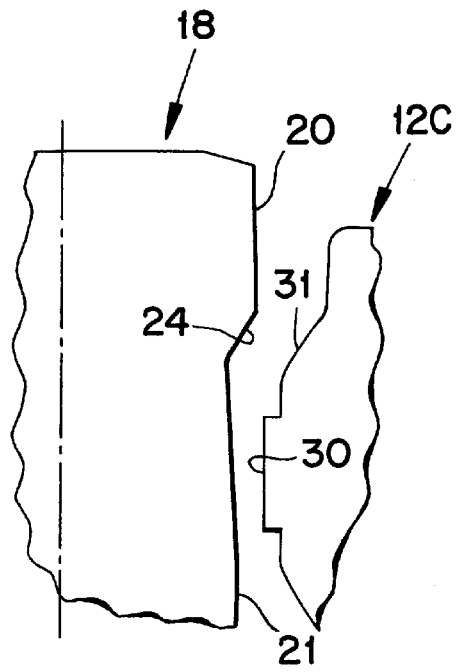
FIGS. 6A and 6B show sectioned side views during mounting of a cutting tool substantially according to FIG. 3.
Figure 6B:
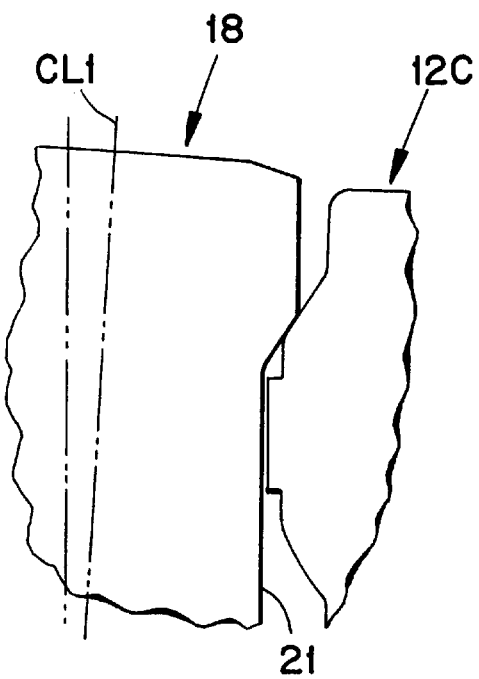

When mounting a cutting insert according to FIGS. 3, 6A and 6B the cutting insert 12B/12C is brought, in a manner described above, over the pin such that the hole 19B/19C occupies the major part of the head 20 and of the waist 21 of the pin. Subsequently the pin is rotated such that the conical surfaces 22 and 28 abut against each other. At further screwing, the pin is tilting in direction D, totally an angle change of about 3°, such that the other conical portion 24 engages with the conical part 31 of the hole 19B/19C. Thereby the cutting insert is displaced until its side surfaces engage with support surfaces adapted for the actual insert shape. Further inwards screwing results in that the pin is elastically pre-stressed without further change of position of the cutting insert, as is shown in FIG. 3 and FIG. 6B. In this position the cutting insert is held in a safe manner.

Figure 7:
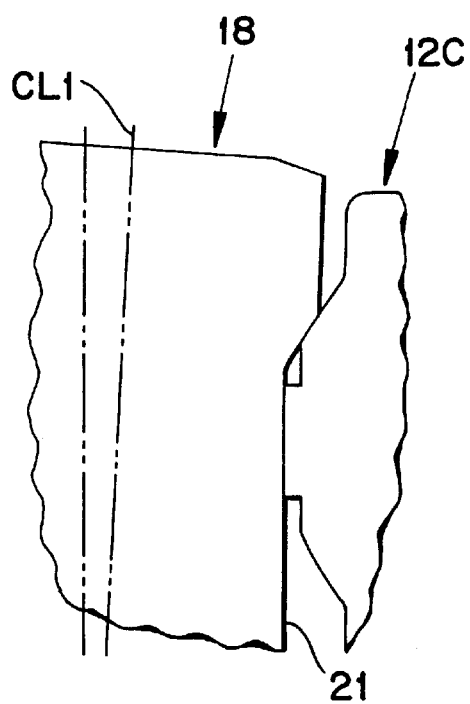
FIG. 7 shows a possible final position of the mounting according to FIGS. 6A and 6B.

Alternatively the tolerances of the participating components be adapted such that also the waist 21 comes into abutment against the insert hole, such as is shown in FIG. 7. Thereby two places of contact have arisen between the pin and the insert hole, which give further clamping power against the cutting insert. Since the waist is somewhat conical, about 3°, in direction towards the head, the envelope surface of the waist 21 abuts along a line section against the cylindrical bore wall 30 in the cutting insert. The latter the user experiences as a sudden increase of the torsion resistance of the pin and indicates that the pin is sufficiently tightened. In the position according to FIG. 7 the pin has been rotated about ¾ of a revolution, whereof the last one eighth of the revolution forms said line contact.

A basic idea of the present invention is that the cutting insert 12 can be mounted/removed without removing the locking pin 18 from the holder body, i.e. the locking pin is of the quick action type. In fact only a limited axial displacement of the locking pin is needed to allow the cutting insert 12 to be mounted/removed. The pin 18 is thus provided to be able to clamp both cutting inserts with straight cylindrical holes and cutting inserts with profiled holes, by having the head 20 and the waist 21 bent during tightening of the pin, in direction away from the support surfaces 15, 16, such that the transition 24 between the head and the waist cooperates with a conical portion 31 of the insert hole 19A, 19C while only the head cooperates with a cylindrical insert hole. This means that the user, with one holder, can use a lot of different cutting geometries.

We claim:

1. A cutting tool for chip removal comprising:

a holder having an insert pocket including a base surface, support surfaces, extending upwardly from said base surface and a boring extending downwardly through said base surface, a cutting insert seated in said pocket and comprising a first major surface engaging said base surface, side surfaces supported by said support surfaces, a second major surface having at least one cutting edge, and a through-hole extending through said insert from said first major surface to said second major surface, a threaded locking pin insertable through said through-hole and securable in said through-hole for releasably securing said insert to said holder and permitting said insert to be removed from, and seated upon, said pocket without completely detaching said pin from said through-hole, said pin comprising a head, a waist, a conical portion and a threaded portion, said pin conical and threaded portions having a common center axis in an unloaded condition, wherein said boring includes a conical recess provided to displace the pin in a direction forming acute angles with respective ones of the support surfaces, whereby the cutting insert is displaced towards the support surfaces by means of a tightening of the pin in the boring, wherein the pin is capable of securing a first type of cutting inserts having straight cylindrical holes and a second type of cutting inserts having profiled holes when disposed in similarly adapted insert pockets, by providing for elastic bending of at least the head of the pin during a final phase of tightening of the pin, in said direction forming acute angles with respective ones of the support surfaces, wherein at least one transition portion between the head and the waist cooperates with a profiled hole in the second type of cutting inserts and the head cooperates with a cylindrical insert hole in the first type of cutting inserts, wherein the head is conical in order to attain contact with the cylindrical hole when mounted, wherein the conicity, with the apex directed away from the base surface, is defined by an acute angle of about 1–2° relative to the center axis.

2. The cutting tool according to claim 1, wherein the head is conical in order to attain contact in the first place of contact when mounted, wherein the conicity, with the apex directed away from the base surface, is defined by an acute angle of about 1–2° relative to the center axis.

3. The cutting tool according to claim 1, wherein the pin and the boring of the holder define a first contact surface which forms a first acute angle with the common center axis of the locking pin, said first acute angle is approximately 20–35° and a place of contact between the transition portion and the second type of cutting inserts forms an acute angle with the common central axis of the locking pin, which is substantially equal to the first acute angle.

4. The cutting tool according to claim 1, wherein the head has an axial extension which lies within the interval of 8–12% of a total length of the pin.

5. The cutting tool according to claim 1, further including a shim provided with a hole, said shim defining the base surface of the insert pocket and disposed between the cutting insert and the holder, said pin including a flange for retaining said shim.

6. The cutting tool according to claim 5, wherein the transition portion includes a conical portion, approximately 4% of a total length of the pin is constituted by an axial extension of the conical portion and a length of the waist to the flange constitutes 24–32% of the length of the pin.

7. Locking pin for a cutting tool including a holder having an insert pocket with a base surface, support surfaces extending upwardly from the base surface, and a boring extending downwardly through the base surface, said pin comprising a head, a waist, a transition portion and a threaded portion, said pin transition and threaded portions having a common center axis in an unloaded condition, wherein the pin defines three possible places of contact with a cutting insert, a first place of contact occurring at the head of the pin, a second place of contact occurring at the transition portion and a third place of contact occurring at the waist, wherein said places of contact are situated sequentially in a direction towards the threaded portion.

8. Locking pin according to claim 7, wherein the head has an axial extension which lies within the interval of 8–12% of a total length of the pin.

9. Locking pin according to claim 7, wherein the pin includes a flange defining the biggest diameter of the pin, the transition portion comprises a conical portion, about 4% of a total length of the pin consists of an axial extension of the conical portion and a length of the waist to the flange constitutes about 24–32% of the total length of the pin.

10. The cutting tool according to claim 1, wherein the boring extends perpendicularly through said base surface.

11. The cutting tool according to claim 3, wherein said first acute angle is approximately 30°.

12. The cutting tool according to claim 4, wherein the head has an axial extension of approximately 10% of the total length of the pin.

13. Locking pin according to claim 9, wherein the length of the waist to the flange constitutes approximately 28% of the total length of the pin.

14. A cutting tool for chip removal comprising:

a holder having an insert pocket including a base surface, support surfaces, extending upwardly from said base surface and a boring extending downwardly through said base surface, a cutting insert seated in said pocket and comprising a first major surface engaging said base surface, side surfaces supported by said support surfaces, a second major surface having at least one cutting edge, and a through-hole extending through said insert from said first major surface to said second major surface, a threaded locking pin insertable through said through-hole and securable in said through-hole for releasably securing said insert to said holder and permitting said insert to be removed from, and seated upon, said pocket without completely detaching said pin from said through-hole, said pin comprising a head, a waist, a conical portion and a threaded portion, said pin conical and threaded portions having a common center axis in an unloaded condition, wherein said boring includes a conical recess provided to displace the pin in a direction forming acute angles with respective ones of the support surfaces, whereby the cutting insert is displaced towards the support surfaces by means of a tightening of the pin in the boring, wherein the pin is capable of securing a first type of cutting inserts having straight cylindrical holes and a second type of cutting inserts having profiled holes when disposed in similarly adapted insert pockets by providing for elastic bending of at least the head of the pin during a final phase of tightening of the pin, in a direction forming acute angles with respective ones of the support surfaces, wherein at least one transition portion between the head and the waist cooperates with a profiled hole in the second type of cutting inserts and the head cooperates with a cylindrical insert hole in the first type of cutting inserts, wherein the tool comprises at least two possible places of contact spaced apart in a direction of the common center axis, a first place of contact being defined between the head of the pin and the first type of cutting inserts and a second place of contact being defined between the transition portion and the second type of cutting inserts or the two first mentioned places of contact as well as a third place of contact between the waist and the second type of cutting inserts wherein said places of contact are situated sequentially in a direction towards the base surface.

* * * * *